United States Patent
Cammert et al.

(10) Patent No.: US 9,286,354 B2
(45) Date of Patent: Mar. 15, 2016

(54) SYSTEMS AND/OR METHODS FOR FORECASTING FUTURE BEHAVIOR OF EVENT STREAMS IN COMPLEX EVENT PROCESSING (CEP) ENVIRONMENTS

(75) Inventors: Michael Cammert, Wettenberg (DE); Christoph Heinz, Marburg (DE); Jürgen Krämer, Alsfeld (DE); Tobias Riemenschneider, Schwalmstadt (DE)

(73) Assignee: SOFTWARE AG, Darmstadt (DE)

( * ) Notice: Subject to any disclaimer, the term of this patent is extended or adjusted under 35 U.S.C. 154(b) by 205 days.

(21) Appl. No.: 13/209,996

(22) Filed: Aug. 15, 2011

(65) Prior Publication Data

US 2013/0046725 A1 Feb. 21, 2013

(51) Int. Cl.
*G06N 5/04* (2006.01)
*G06F 17/30* (2006.01)
*G06N 5/00* (2006.01)

(52) U.S. Cl.
CPC .......... *G06F 17/30516* (2013.01); *G06N 5/00* (2013.01)

(58) Field of Classification Search
CPC .......................... G06Q 10/04; G06Q 30/0202
USPC ........................................................ 706/52
See application file for complete search history.

(56) References Cited

U.S. PATENT DOCUMENTS

| | | | |
|---|---|---|---|
| 2002/0152305 A1* | 10/2002 | Jackson et al. | 709/224 |
| 2008/0255760 A1* | 10/2008 | Rojicek et al. | 702/3 |
| 2009/0247910 A1* | 10/2009 | Klapper | 600/595 |
| 2010/0229178 A1* | 9/2010 | Ito | 718/104 |
| 2011/0046887 A1* | 2/2011 | Veldhuis et al. | 702/19 |
| 2011/0099136 A1* | 4/2011 | Barajas et al. | 706/13 |
| 2011/0110430 A1* | 5/2011 | Guo et al. | 375/240.16 |

OTHER PUBLICATIONS

Cho et al., On-line rule matching for event prediction, The VLDB Journal (2011) 20:303-334. Published online Jul. 1, 2010.*
Friedler and Mount, Spatio-temporal Range Searching Over Compressed Kinetic Sensor Data, ESA'10, presented Sep. 7, 2010.*
Hulten et al., Mining Time-Changing Data Streams, KDD'01.*
European Centre for Medium-Range Weather Forecasts, IFS Documentation—Cy37r2, Operational implementation May 18, 2011, Part II Data Assimilation. Downloaded from http://nwmstest.ecmwf.int/research/ifsdocs/CY37r2/IFSPart2.pdf on Dec. 22, 2014.*

(Continued)

*Primary Examiner* — Kakali Chaki
*Assistant Examiner* — Michael Zidanic
(74) *Attorney, Agent, or Firm* — Nixon & Vanderhye P.C.

(57) ABSTRACT

Certain example embodiments described herein relate to forecasting the future behavior of event streams in Complex Event Processing (CEP) environments. For each received event in an event stream, a reference window indicative of a predefined temporal range during which the forecast is to be computed is updated so that the reference window ends with the received event, with the reference window moving with the event stream. Within this processing loop, when a forecasting update policy indicates that the forecast is to be updated based on the received event: a forecasting window indicative of a temporal range in which events are to be forecasted is updated; and while the time period of the forecasting window is not exceeded, (a) a next forecasted event is generated via at least one processor and (b) the next forecasted event is inserted into the forecast window; and the forecast window is published.

23 Claims, 5 Drawing Sheets

(56) References Cited

OTHER PUBLICATIONS

WestGlobal. Vantify Overview. [retrieved Aug. 15, 2011] www.westglobal.com/product/vantify-overview.

Progress Software. Apama Services/Progress Software. [retrieved Aug. 15, 2011] htp://web.progress.com/en/apama/services.html.

Streambase. StreamBase Systems Products. [retrieved Aug. 15, 2011] www.streambase.com/procducts-home.htm.

SQLstream. SQLstream Customer Data Integration (CDI). [retrieved Aug. 15, 2011] http://www.sqlstream.com/Solutions/solutionsIndstryVertEntInfoMgmtCDI.htm.

RuleCore Complex Event Processing Server. RuleCore.com—Home. [retrieved Aug. 15, 2011] www.rulecore.com.

IBM WebSphere Business Events. IBM—WebSphere Business Events Version 7.0. [retrieved Aug. 15, 2011] www.-01.ibm/software/integration/wbe/.

System S—Stream Computing at IBM Research. [retrieved Aug. 15, 2011] http://public.dhe.ibm.com/software/data/sw-library/ii/whitepaper/SystemS_2008-1001.pdf.

IBM InfoSphere Streams. IBM—Stream Computing. [retrieved Aug. 15, 2011] www.-01.ibm/software/data/infosphere/streams/.

TIBCO BusinessEvents. [retrieved Aug. 15, 2011] http://www.tibco.com/products/business-optimization/complex-event-processing/businessevents/businessevents.jsp.

SYBASE—Complex Event Processing (CEP). [retrieved Aug. 15, 2011] www.sybase.com/products/financialservicesolutions/complex-event-processing.

CORAL8, Inc. Coral8 Complex Event Processing for Proactive Customer Experience Management. [retrieved Aug. 15, 2011] http://www.sybase.com/files/Technical_Documents/SY_Coral8_CEM_WP.pdf.

SYBASE—Sybase Aleri Event Stream Processor (ESP). [retrieved Aug. 15, 2011] http://www.sybase.com/products/financialservices-solutions/esp.

UC4 Automation Engine: The Industry's Most Complete Automation Solution. [retrieved Aug. 15, 2011] www.uc4.com/products/uc4-automation-platform/uc4-automation-engine.html.

EventZero. Real Time Asset Conditioning Monitoring. [retrieved Aug. 15, 2011] www.eventzero.com/solutions/asset_mgt.aspx.

ActiveinSight Product Overview. [retrieved Aug. 15, 2011] www.activeinsightsaas.com/what-we-offer.

Pion Core—The Open Source Stream Computing Platform. Pion Development Community. [retrieved Aug. 15, 2011] www.pion.org/projects/pion-platform.

EsperTech—Event Stream Intelligence. [retrieved Aug. 15, 2011] www.espertech.com.

EsperTech—Enterprise Ready Event Processing and CEP Platform. [retrieved Aug. 15, 2011] www.espertech.com/products/esperee.php.

Etalis—Event-Driven Transaction Logic Inference System. [retrieved Aug. 15, 2011] http://code.google.com/p/etalis/.

IEPSE—Open EAB: The Open Source ESB for SOA & Integration [retrieved Aug. 15, 2001] http://wiki.open-esb.java.net/Wiki.jsp?page=IEPSE.

Drools Fusion—JBoss Community [retrieved Aug. 15, 2011] www.jboss.org/drools/drools-fusion.html.

TRUVISO. STRADA Overview. [retrieved Aug. 15, 2011] www.truviso.com.

Oracle—Generating Forecasts. 7 Generating Forecasts. [retrieved Aug. 15, 2011] http://download.oracle.com/docs/cd/B19306_01/olap.102/b14349/forecast.htm.

Microsoft StreamInsight. [retrieved Aug. 15, 2011] http://msdn.microsoft.com/en-us/library/ee362541.aspx.

Nastel Technologies Product Overview. Driving Business Transaction Performance. [retrieved Aug. 15, 2011] http://www.nastel.com/business-transaction-performance-reduce-risks-and-ensure-stability_99_86.html.

Starview Technology. Starview Smart Enterprise Platform. [retrieved Aug. 15, 2011] http://www.starviewtechnology.com/starview-products.html.

EventGnosis, Inc.—Event Processing Made Simple! [retrieved Aug. 15, 2011] http://eventgnosis.com/cep.php.

Informatica. The Informatica Platform: Delivering Value to the Business. [retrieved Aug. 15, 2011] http://vip.informatica.com/?elqPURLPage=8873&gclid=CMST16n90aoCFQaA5Qod1x0g1Q.

Domnic Savio et al., "Predicting Energy Measurements of Service-Enabled Devices in the Future Smartgrid," Computer Modeling and Simulation 2010.

Lajos Fülöp et al., "Survey on Complex Event Processing and Predictive Analytics," Technical Report Jul. 13, 2010.

Árpád Beszédes et al., "Predicting Critical Problems from Execution Logs of a Large-Scale Software System," Proceedings of the 11th Symposium on Programming Languages and Software Tools and 7th Nordic Workshop on Model Driven Software Engineering. [online] [retrieved Aug. 15, 2011].

Chuanfei Xu et al., "Research on Event Prediction Algorithm Based on Event Sequence Semantic," 2009 6th International Conference on Fuzzy Systems and Knowledge Discovery.

Nihal Dindar et al., "Efficiently Correlating Complex Events Over Live and Archived Data Streams," DEBS 2011.

Gabriella Tóth et al., "Complex Event Processing Synergies with Predictive Analytics," DEBS 2010.

Tobias Riemenschneider, "Optimierung Kontinuierlicher Anfragen Auf Basis Statistischer Metadaten," 2008 PhD Thesis Paper (relevance discussed in paragraph [0052] of the instant specification).

Eugene A. Feinberg et al., "Load Forecasting," Chapter 12, pp. 269-285.

Luca Montanari, Ph.D. Research Plan 2010/2011, Sapienza Università Di Roma, Dipartimento di Informatica e Sistemistica "Antonio Ruberti".

\* cited by examiner

SYSTEMS AND/OR METHODS FOR FORECASTING FUTURE BEHAVIOR OF EVENT STREAMS IN COMPLEX EVENT PROCESSING (CEP) ENVIRONMENTS

FIELD OF THE INVENTION

Certain example embodiments described herein relate to forecasting the future behavior of event streams in Complex Event Processing (CEP) environments. In certain example embodiments, while events stream in, new forecasts may be automatically computed with respect to a continuously or discontinuously moving time window. The forecast may then estimate on the basis of the movable window the future values and the time they will occur, and the forecasting framework may be flexibly defined and parameterized to allow for a tailored adaptation in certain example implementations.

BACKGROUND AND SUMMARY OF EXAMPLE EMBODIMENTS OF THE INVENTION

An increasing number of applications continuously produce huge amounts of data. These data may be thought of as event streams. Complex Event Processing (CEP) systems have been designed to analyze those event streams and derive, among other things, meaningful, relevant patterns in a real-time or substantially real-time manner, whether it be for technical purposes or for business related purposes.

CEP systems typically leverage filtering, aggregation, correlation, and/or pattern matching functionalities to continuously analyze the events consumed to a given point. In order to allow for a proactive reaction, the inventors of the instant application have realized that the typical techniques could be extended by forecasting the future behavior of the event streams. Such a forecast could be based on already consumed events, for example, from a sliding timeframe.

Moreover, within a CEP system, such a forecasting functionality could, for example, be leveraged on the system side, as well as on the user side. For instance, the user could specify a forecast for an input stream. This forecast functionality could be seamlessly integrated into the Event Query Language underlying the CEP system. By setting up a corresponding forecasting query, the user could, for example, estimate the number of orders until the end of the day, the price of a stock 10 minutes later, the number of network outages within the next two hours, the number of road accidents or other technical or physical events, etc.

CEP systems typically have to process multiple high-volume streams with brittle characteristics. Thus, it is desirable to provide very robust CEP systems. Forecasting future behavior of those streams may advantageously provide a proactive management of the system possible. For instance, if a low system load is expected, the system could trigger internal, computationally expensive optimizations that help optimize or improve the event flow and throughput. By contrast, if a high system load is expected, the system could assign the corresponding processing threads for the affected input streams a higher priority.

CEP systems typically continuously receive and thus may analyze in a real-time manner a very large number of events. This presents several challenges. A first issue is that the user may want to forecast the future behavior of the event stream for possible use in forming proactive reactions. For that purpose, the corresponding Event Query Language can be extended so that the user can specify the forecast in an intuitive manner. A second issue is how to make a CEP system, which typically has to be highly adaptive, use forecasting functionality to estimate future stream behavior and base its system management decisions on this forecast. A third issue is that in both cases, it would be advantageous to make the forecasts in an online manner. This includes, for example, an online forecasting of the complete next events, e.g., which value do they have, when do they occur, and which temporal information do they carry. A fourth issue is that such an online forecasting functionality may have to be suitably integrated into a CEP system and also may have to be flexibly designed to allow for different event representations, time frames, and/ or forecasting strategies.

The inventors of the instant application note that the issue of forecasting in event streams and its application to CEP environments may involve, for example, trend/forecasting/ predictive analytics, in the context of complex event processing/event stream processing/data stream processing/stream mining.

There are a number of approaches for handling such data. For instance, it is noted that the database approach uses a database system to store data in a persistent manner. SQL queries, for example, can be used to derive specific, mostly simple forecasting functionality for data in a database. Unfortunately, however, the SQL standard has no explicit clause reserved for modeling forecasting functionality. More complex forecasting strategies are typically computed on top of a database system.

Moreover, the conventional database approach alone is not suitable for high-volume event stream processing. Database systems are not designed for a continuous processing of incoming events. As a consequence, they also are not designed for incrementally updating forecasts in a real-time manner. It may be that database systems use forecasting functionality for system management decisions, but this probably would have to be performed on a periodic base instead of a continuous one. The continuous approach per se captures the latest developments of the stream characteristics, while the periodic one runs the risk of making decisions on outdated stream characteristics.

Certain techniques involve calculating a weighted average and applying a smoothing function in a proprietary Event Query Language. Unfortunately, however, those functions do not estimate the events for the next time period. In Spotfire Operations Analytics (commercially available from TIBCO), for example, it is believed that the public information does not indicate that forecasting of events for a future time period is provided.

Thus, it will be appreciated by those skilled in the art that there is a need in the art for techniques that address one of more of the above-described and/or other issues, and/or provide improved forecasting of future behaviors of event streams in a CEP environment.

One aspect of certain example embodiments of this invention relates to techniques for an "online" forecasting of event streams. While events stream in, new forecasts may be automatically computed with respect to a continuously or discontinuously moving time window. The forecast may then estimate on the basis of the movable window the future values and the time they will occur (e.g. the events in the next hour). The forecasting framework may be flexibly defined and parameterized to allow for a tailored adaptation in certain example implementations. Certain example embodiments of this invention relate to applications of the forecasting functionality in CEP systems, illustrating how that functionality may be incorporated into the Event Query Language, as well as into the system management component.

Another aspect of certain example embodiments of this invention relates to forecasting events equipped with temporal information in the CEP context. In certain example embodiments, a future value is estimated, as are the future events expected in a predefined timeframe, including the temporal information of the events. A forecasting algorithm according to certain example embodiments may be used to estimating the value of events, as well as their temporal occurrence and temporal information. Thus, a flexible framework for forecasting event streams in an online manner and taking care of different event stream representations, reference and forecasting windows, window models, and/or forecasting strategies may be provided in certain example embodiments of this invention.

Another aspect of certain example embodiments of this invention relates to addressing some or all of the above-described and/or issues in a combined and comprehensive manner. For instance, with respect to the third and fourth issues, a forecasting operator may be provided. The forecasting operator may follow the design principle of encapsulating analysis functionality in an operator. An operator analyzes streams of incoming events directly and produces a continuous query output stream. Thus, the operator of certain example embodiments may support online processing of event streams and directly provide new forecasts. Because of the operator design, the forecasting functionality may be applied to incoming streams, as well as to intermediate streams computed by other operators. To allow for increased flexibility, the operator of certain example embodiments may provide a forecasting framework. This framework may be adapted to different event stream representations, different reference and forecasting windows, different window models, and/or different forecasting strategies. For instance, the operator framework may be designed to compute future events for a future time window and, therefore, may also estimate when the events will occur and which temporal information they carry, and not only what their values will be.

The second issue noted above may be addressed along with an implementation of the operator approach. The forecasting operator may, for example, be plugged into the input streams. With that example approach, the system may monitor its input streams on demand and in a flexible manner. Because the continuous provision of latest forecasts, the system may react very flexibly to changing stream characteristics. The corresponding forecasts may be used in certain instances to determine future load profiles that, in turn, may provide decision support for system management. Different example applications in system management are set forth herein for that purpose.

The first issue may be addressed by using the forecasting operator functionality available in the Event Query Language. The user may directly specify forecasting functionality in a continuous query and set corresponding sizes for reference and future window. Different window models may be supported in different implementations. Because of the processing paradigm, this query may be continuously evaluated, and the user may be continuously presented with the latest forecasts when new events stream in.

Thus, certain example embodiments may incorporate some or all of the following and/or other features:

An online forecasting operator that continuously produces forecasts based on a continuously moving temporal window;

A flexible framework for the forecasting operator, allowing for different event stream representations, window models, and/or forecasting strategies;

Specification of the forecasting operator for events based on time interval representation;

Forecasting of temporal occurrence of future events for a future time window;

Integration of forecasting functionality in the Event Query Language with support for different window models; and/or Use of the forecasting operator for system management tasks.

The inventors are not aware of current techniques that incorporate forecasting functionality in the Event Query Language for different reference and forecasting windows, window models, and update policies. This includes the flexible framework design that allows plugging in a variety of forecasting strategies. Current solutions also are believed to lack a forecasting operator used for queries set up by the user, as well as for system management purposes. With respect to system management, the inventors are not aware of current techniques that use online forecasts of input streams and intermediate query result streams as foundation for system management decisions, e.g., in the area of optimization, adaptation to query load, and/or tracing of load-intensive queries. Thus, still another aspect of certain example embodiments relates to providing these "missing" features.

In certain example embodiments, a method of forecasting how an event stream will behave in the future is provided. An event stream including a plurality of events upon which a forecast is to be based is received. For each received event in the event stream, a reference window indicative of a predefined temporal range during which the forecast is to be computed is updated so that the reference window ends with the received event, with the reference window moving with the event stream. Within this processing loop, when a forecasting update policy indicates that the forecast is to be updated based on the received event: a forecasting window indicative of a temporal range in which events are to be forecasted is updated; and while the time period of the forecasting window is not exceeded, (a) a next forecasted event is generated via at least one processor and (b) the next forecasted event is inserted into the forecast window; and the forecast window is published.

According to certain example embodiments, the reference and/or forecasting window(s) is/are time-based or count-based. According to certain example embodiments, the forecasting update policy triggers an update upon a predefined number of events occurring or at a user-specified time interval.

According to certain example embodiments, it is possible to adjust, in response to user input, the reference window to selectively emphasize either short-term or long-term stream tendencies in the event stream. Parameters of the selected forecasting strategy may be adapted based on an assessment of predicted event accuracy in certain example instances. A conjoint estimate may be applied to a data portion, event inter-arrival time, and time interval length parameters. A learning algorithm may be applied to the forecast, and the temporal range of the reference window and/or the forecasting window may be adjusted in response to the learning algorithm.

According to certain example embodiments, the forecasting of the next events comprises, for each forecasted next event: calculating a data portion for the forecasted next event based on data portions of the events in the sliding reference window; calculating a start timestamp for the forecasted next event; and calculating an end timestamp for the forecasted next event. The start timestamp for the forecasted next event may be calculated by adding to an immediately prior start timestamp an estimated distance to the next start timestamp. Optionally, the estimated distance may be based on distances from the reference window, the end timestamp for the forecasted next event may be calculated by adding an estimated time interval length to the calculated start timestamp for the forecasted next event, and/or the estimated time interval length may be based on time interval lengths of events in the reference window. In certain implementations, at least one forecasted next event may be used in the forecasting of another forecasted next event forecasted to occur later in time.

According to certain example embodiments, the forecasting of the next events is practiced in accordance with a predefined forecasting strategy, with the forecasting strategy including at least one strategy selected from the group consisting of: (a) repeating values from the events in the reference window in a forward or backward manner; (b) randomly selecting values from the events in the reference window; (c) applying a weighted or unweighted average to values from the events in the reference window; (d) smoothing an incrementally computed weighted average of the next event and a last estimate in accordance with a smoothing parameter controlling the emphasis of recent events; (e) performing density-based resampling; and (f) combining the reference window with a set of one or more predefined historic reference windows.

According to certain example embodiments, events in the reference window may be compressed. In some instances, the temporal range of the reference window may be increased, with the compressing and increasing being balanced so that forecasting quality increases at a rate faster than compressing introduces error.

According to certain example embodiments, business data indicative of events in the event stream along with business data indicative of forecasted events, and/or system management event data along with forecasted system management event data may be output to a display.

Non-transitory computer readable storage mediums tangibly storing instructions for performing the above-summarized and/or other methods also are provided by certain example embodiments, as well as corresponding computer programs.

Analogous systems also may be provided in by certain example embodiments. For instance, certain example embodiments relate to a complex event processing (CEP) system comprising at least one processor, a CEP engine under the control of at the least one processor, and at least one input adapter configured to receive an event stream including events and feed event data for the events from the event stream to the CEP engine. The CEP engine comprises at least one operator configured to directly or indirectly receive and process the event data for subsequent, direct or indirect, output to a system management application of the CEP system and/or an event consuming application or component in communication with the CEP system, as well as t least one forecasting operator configured to directly or indirectly receive and process the at least one said event stream. The processing may include (a) for each received event in the event stream updating a reference window indicative of a predefined temporal range during which the forecast is to be computed so that the reference window ends with the received event, with the reference window moving with the event stream, and when a forecasting update policy indicates that the forecast is to be updated based on the received event: updating a forecasting window indicative of a temporal range in which events are to be forecasted; and while the time period of the forecasting window is not exceeded, (i) generating via at least one processor a next forecasted event and (ii) inserting the next forecasted event into the forecast window; and publishing the forecast window. The forecast may be directly or indirectly output to the system management application of the CEP system and/or an external application or component.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
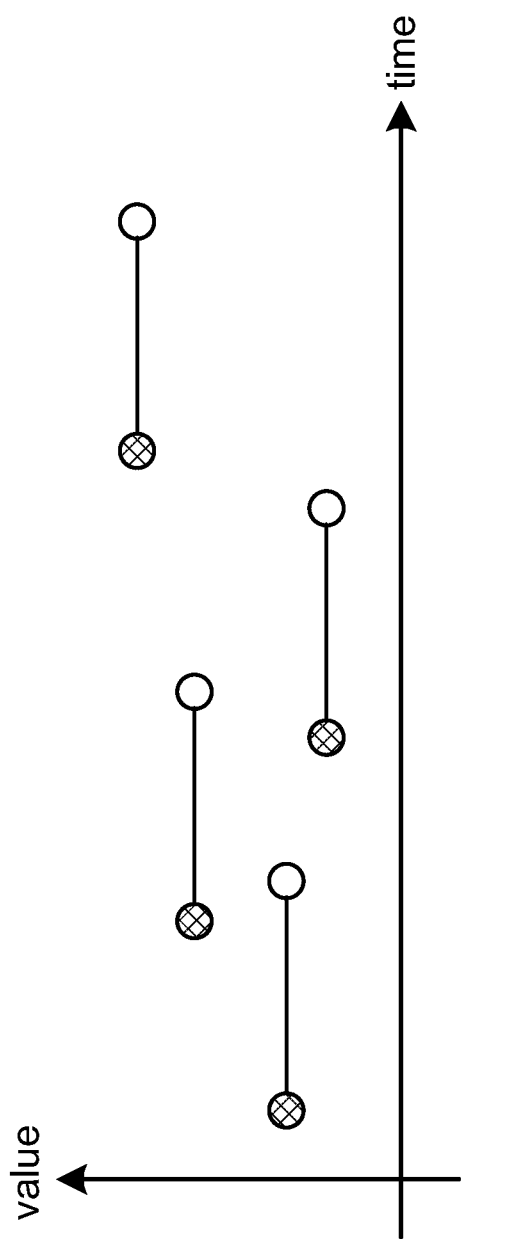
FIG. 1 is an example event stream using a time interval representation.

As is known, a CEP system processes and analyzes high volumes of event streams. An event stream generally may be thought of as a continuously increasing sequence of events. These events may be thought of as including, for example, a data portion and a temporal component stating when the event occurred (e.g., an order for a car has been filed at 10 pm or a physical measurement has been taken at a certain point in time). Different temporal representations of events exist using, for example, a single timestamp, a time interval, a positive-negative declaration for a single timestamp, etc.

The forecasting techniques of certain example embodiments may receive those events and continuously maintain a temporal window of events. The size of this window (e.g., the last hour or the last 10 events, etc.) may be a configurable parameter of the underlying algorithm. The forecasting time window (or the time window for which the events are to be forecasted) also may be parameterized in certain example embodiments. For example, the forecasting algorithm of certain example embodiments may be configured to refer to the last three hours and to forecast the events for the next ten minutes. Another parameter that may be user-specified is the update frequency of the forecast (specifying, for example, whether the forecast is to be updated for each incoming event, every five minutes, etc.). The forecasting strategy itself also may be parameterized in certain example embodiments. A plurality of different forecasting strategies may be leveraged to forecast the value of future events and when they will occur in the specified forecasting window. In general, the forecasting algorithm of certain example embodiments may process events in an online fashion and thus meet the typically strict CEP processing requirements.

The forecasting techniques of certain example embodiments may be embedded into a CEP system. A CEP system typically uses adapters to connect to event streams. Operators may be connected to those adapters, where an operator includes specific analysis logic. In the same way, a forecasting operator may be made to receive events, maintain a temporal window of events, and compute a new forecast. The flexible design allows not only computing forecasts for input event streams, but also for result streams of other operators.

In certain example embodiments, the forecasting functionality may be integrated into the user interface to enable the user to specify business logic using forecasting. Examples of business logic may include, for example, a user wanting to forecast car orders in the next hour, a user having computed the average number of network outages in the last two hours and now wanting to forecast the corresponding number for the next 30 minutes, etc. The Event Query Language may be extended by a FORECAST clause with corresponding window settings in certain example embodiments to help facilitate the implementation of such features.

Other forecasting applications may be located in system management. CEP systems typically have to be highly adaptive, as the characteristics of the input streams and thus the system load may vary heavily. In general, the stream characteristics have been found to have a direct influence on the processing costs of queries. Therefore, as alluded to above, the system could leverage forecasts of streams to adapt to future load profiles in a proactive way. For example, a query optimizer of a CEP system could periodically evaluate the event processing flow through the queries and, if a low input load is expected in the near future, the system could use the free resources to trigger that optimization process in advance.

An example framework for computing and using forecasts in a CEP environment will now be provided. It will be appreciated that although certain aspects of the example framework are described in connection with concrete settings and strategies, they can also be adapted accordingly to other settings and strategies. Furthermore, although the following examples discuss a forecasting of events represented with the well-established time interval approach, it will be appreciated that such techniques may be adapted to other approaches as an alternative or addition.

In the time interval approach, an event includes a data portion e and a time interval $[t_s, t_e)$. The time interval describes the validity of the event starting with $t_s$ (inclusive) to $t_e$ (exclusive). The events in the stream are individually ordered by the start timestamps.

FIG. 1 is an example event stream using a time interval representation.

As indicated above, the forecasting of event streams may involve some or all of the following parameters:

Reference window: The reference window refers to the temporal window of events used for computing the forecast. It can be a time window (e.g., the last hour) or a count-based window (e.g., the last 10 events) in different implementations and optionally as specified by the user. When a new event arrives, the window may be updated to contain the corresponding previous events with respect to the new event. Thus, the window moves with the event stream. With this parameter, the influence of older data can be controlled. Depending on the setting, either short-term or long-term stream tendencies may be emphasized.

Forecasting window: The forecasting window refers to the temporal window for which events are to be forecasted. In different implementations and as optionally set by the user, the forecasting window may be a time window (e.g., the next hour) or a count-based window (e.g., the next 10 events). This parameter may define the period for which future events are to be estimated. Longer forecasting windows will typically result in lower estimation accuracy, although this is not always the case.

Forecasting update: The update policy may specify when a new forecast is to be computed and thus provided. The forecasting update parameter may be set for each incoming event or by traversing a partitioned time axis (e.g., each 10 minutes) in different implementations and as optionally set by the user. Other triggers may be used, e.g., the occurrence of a predefined event such as, for example, a power outage, particularly high or low output or processing resources available, etc.

Forecasting strategy: The forecasting strategy may define how the events of the forecasting window are to be computed based on the values from the reference window.

To estimate an event using the time interval approach, the data portion e, the start timestamp $t_s$, and the time interval length $t_e - t_s$ may be estimated. With respect to the data portion, the following discussion assumes that the data portion includes a single numeric value from a metric scale. For events with different attributes, including attributes with values from a non-metric scale, however, a corresponding forecasting strategy may be chosen. For estimating a new event, the variables data portion, start timestamp, and time interval length may be independently estimated using a forecasting strategy. These estimations may be based on the corresponding values of the events in the reference window. Given the last event of the reference window, future events may be generated until the end of the forecasting window is reached. Depending on the forecasting update setting, this computation of the forecast may be triggered for each incoming event or when a preset update period has elapsed.

The parameters briefly discussed above may be defined in accordance with following table, and the example algorithms discussed below adhere to these definitions:

| Parameter | Description |
| --- | --- |
| $w_{ref}$ | The reference window |
| $w_{fc}$ | The forecasting window |
| $update_{fc}$ | The forecasting update policy |
| $f_{data}$ | The forecasting function delivering the next data portion value |
| $f_{ts}$ | The forecasting function delivering the distance to the next start timestamp |
| $f_{ti}$ | The forecasting function delivering the next time interval length |
| $(e', [t'_s, t'_e))$ | The new future event |

The following pseudo-code algorithm summarizes the general steps discussed above:

```
1: for each incoming event do
2:   update w_ref to end with new event;
3:   evaluate update_fc with new event;
4:   if(update_fc returns true)
5:     flush w_fc;
6:     update temporal range of w_fc;
7:     while(temporal range of w_fc is not exceeded)
8:       compute next forecast event (e',[t'_s,t'_e));
9:       insert (e',[t'_s,t'_e)) into w_fc;
10:    publish w_fc;
```

Figure 2:
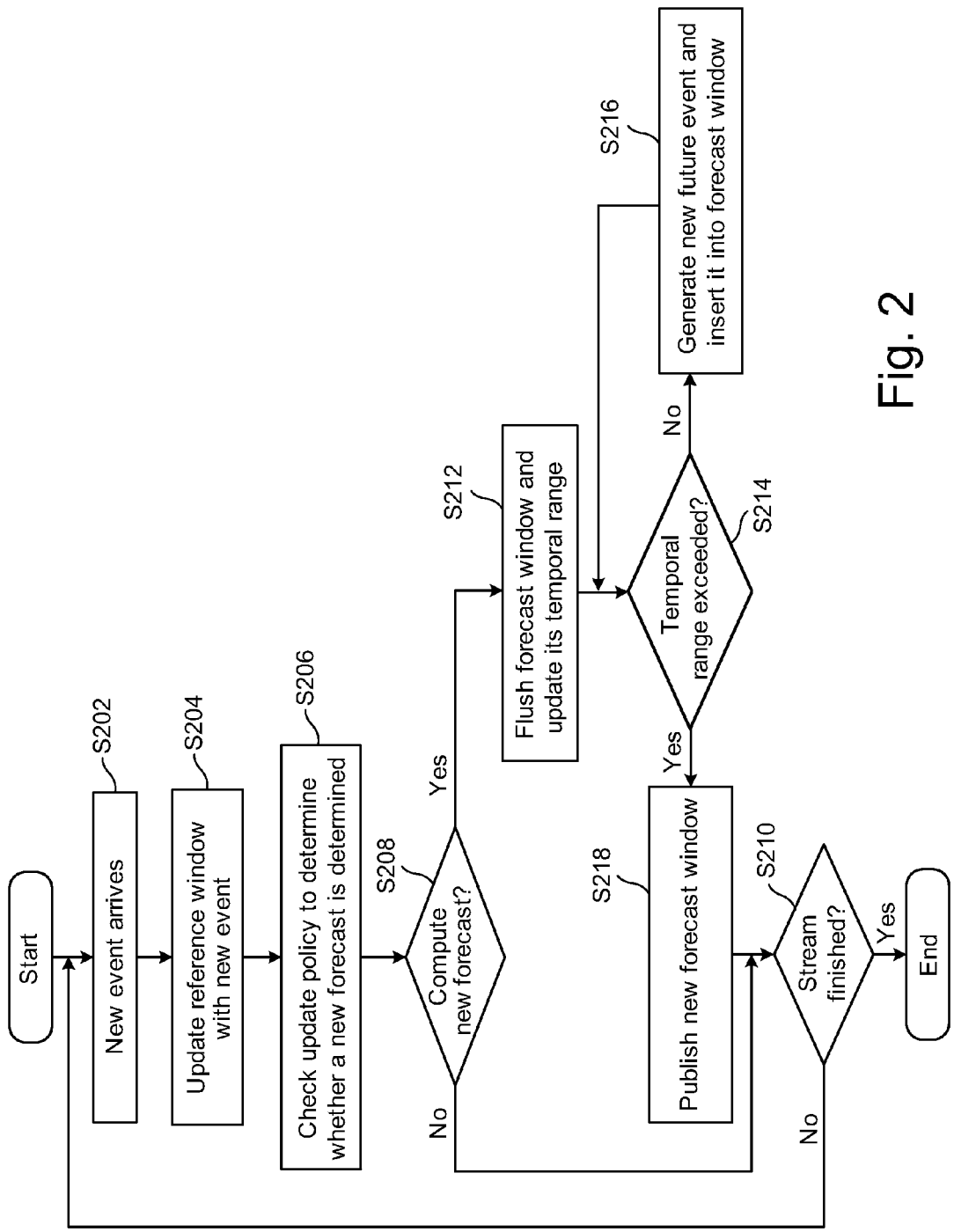
FIG. 2 is a flowchart illustrating an example process demonstrating how the future behavior of event streams may be forecasted in certain example embodiments.

FIG. 2 visually demonstrates this example algorithm. As shown in FIG. 2, a new event stream arrives in step S202. The reference window is updated with the new event in step S204, e.g., so that the reference window now ends with the newly arrived event. In step S206, the update policy is checked to determine whether a new forecast is to be determined based on the newly arrived event. If step S208 indicates that a new forecast does not need to be determined, then a check is performed in step S210 to determine whether the stream is finished. If the stream is not finished, then the process returns to S202 in anticipation on another new event arriving. If the stream is finished, however, then the FIG. 2 example process is ended.

If step S208 indicates that a new forecast is to be determined, however, then in step S212 the forecast window is flushed or reset, and its temporal range is updated. A check is then made in step S214 to determine whether the temporal range has been exceeded. If the temporal range is not exceeded, then in step S216, a new future event is generated and inserted into the forecast window.

Once the temporal range has been exceeded as determined in step S214, the new forecast window is published in step S218. As above, a check is performed in step S210 to determine whether the stream is finished. And as above, if the stream is not finished, then the process returns to S202 in anticipation on another new event arriving. If the stream is finished, however, then the FIG. 2 example process is ended.

The forecasting strategy, which may derive a set of future events from the events of the reference window, will now be discussed. It is noted that the forecasting strategy is implicated by lines 7-9 in the pseudo-code algorithm above and, thus, steps S212, S214, and S216. A given forecasting strategy may be independently executed for the data portion, start timestamp, and time interval length. The following example algorithm describes one way to compute a new event:

First, the data portion is computed from the data portion of the reference window. Second, the start timestamp is computed by adding to the previous start timestamp the estimated distance to the next start timestamp. This estimated distance could be based on the distances from the reference window, for example. In addition, or in the alternative, other criteria may be used such as, for example, the time of the day. The end timestamp is computed by adding the estimated time interval length to the start timestamp. This estimated length may be based on the time interval lengths of the reference window in certain example instances. Depending on the forecasting strategy, the values from the previous future event may also be used in addition to the reference window.

This example approach may be represented using the following pseudo-code, in which $w_{ref} = (e_1, [t_{s1}, t_{e1}]), \ldots, (e_n, [t_{sn}, t_{en}])$:

```
1: if (w_fe is empty)
2:     t'_s = t_sn;
3: e' = f_data(e_1,...,e_n);
4: t'_s = t'_s + f_ts(t_s2 - t_s1,...,t_sn - t_(sn-1));
5: t'_e = t'_s + f_tl(t_e1 - t_s1,...,t_en - t_sn);
6: return (e', t'_s, t'_e);
```

It is noted that this pseudo-code algorithm is somewhat similar to the approach set forth in Tobias Riemenschneider's PhD thesis, entitled, *Optimierung kontinuierlicher Anfragen auf Basis statistischer Metadaten*, at Section 4.3.1. This work as a whole discusses the optimization of continuous queries using statistical metadata. It uses statistics-based simulation to estimate the future behavior of queries. Density estimators are computed with respect to a training data set that can be periodically updated. A separate density estimator is established for data portion, interarrival rate, and time interval length of events. These estimators are then used to draw samples of events, which are used as forecasts. Thus, this work uses one proposed forecasting technologies that may be used in connection with the forecasting of future events. The forecasts in this work are used to measure potential query costs in query optimization. Overall, this work is based on a periodically updated forecasting model for the specific case of query optimization. It does not cover the forecasting framework approach, operator modeling, the general purpose forecasting of events using different window models, event stream representations, and forecasting strategies, as well as the integration into the Event Query Language, and all of the proposed system management applications. The approach set forth in Section 4.3.1 derives the next event and its temporal occurrence with the help of estimated distributions, and it also uses the inter-arrival rate and the time interval length. However, this estimation is based on previously computed densities, and not on a moving reference window. Moreover, in certain example embodiments, abstractions may be taken from the concrete forecasting technology.

In any event, a check as to whether the temporal range of the forecast window is exceeded may depend on the window type. For a count-based window, a check may be made as to whether the number of produced future events is less than or equal to the window size. For a time window, however, a check may be made as to whether the start timestamp of the future event lies in the window that starts with the start timestamp of the last event from the reference window.

Different example strategies may be used for the forecasting itself. For example, some or all of the following strategies may be used:

Simple forecast: Repeat the values from the reference window, either in a forward or a backward manner.

Random forecast: Randomly select values from the reference window.

Weighted average: Build a weighted average of the values. Use a convex linear combination of 1 as weights. A special case is 1/n, which gives each value the same weight.

Exponential smoothing: Compute incrementally a weighted average of the next event and the last estimate. A smoothing parameter allows adjusting the emphasis on recent events.

Density-based resampling: Use a non-parametric estimation of the distribution and draw a sample. For the non-parametric estimation of the distribution, for example, histograms, kernel density estimators (KDEs), wavelet density estimators, etc., may be used. With the estimated distribution, a representative sample of values following this distribution can be drawn.

Reference curve combination: Use the reference window and a set of predefined historic windows. These historic windows span a wider temporal range, e.g., one window covers the previous day, one covers the day one week earlier, and one covers the previous month. A weighted average of those historic windows is computed so that the reference window is perhaps best approximated. When a new forecast is to be computed, the weights are recomputed with respect to the current reference window. This average is used to derive the forecasting window. For example, if historic data from three days is available and the current time is 2 pm, then the averaged historic data can be used to estimate the forecasting window from 2 pm to 6 pm.

The algorithm described in connection with the first pseudo-code snippet and FIG. 2 may be extended in a number of different possible ways in certain example embodiments of this invention. For example, one extension involves incorporating a continuous feedback for the result quality. When a new event arrives, the quality of the previous forecast can be assessed. Given the results of the assessment, the parameters of the forecasting strategy can be adapted. For example, the weighted average method can be improved by continuously adapting the weights of the past events based on previous forecast quality evaluations. For performance reasons, this result quality assessment may sometimes be triggered on a periodical base (e.g., every 100 events) rather than on a per-event basis. In addition, or in the alternative, a training phase may be introduced before the query is activated. The query may be evaluated over a set of historic data and the corresponding forecasting quality may be evaluated. The parameters of the query therefore may be adapted and their suitability evaluated in a cross-validation step using another reference data set. Using that mechanism, the choice of different forecasting strategies can also be evaluated.

Another similar extension involves the integration of learning algorithms that allow a suitable size to be set for reference and forecasting window. The longer the reference window is, the more memory is allocated, but the better the estimation quality will typically be. The longer the forecasting window is, however, the more uncertain the results typically will be, but the more the user's needs typically are fulfilled. With the help of learning algorithms, those window sizes may be incrementally adapted to the user's needs. A feedback mechanism may be provided for the user to assess the forecasting quality when this extension is implemented.

A further extension concerning the use of forecasting strategies involves applying a conjoint estimation with respect to the parameters. A "basic" version of the algorithm of certain example embodiments may apply forecasting strategies independently for data portion, event inter-arrival time, and time interval length. To cope with dependencies in those parameters (e.g., between 10 am and 11 am, the values are typically higher), a multi-dimensional forecasting strategy may be applied to estimate all parameters together. For example, the density-based resampling strategy can be used for that purpose in certain example implementations.

Still another extension involves applying compression algorithms (e.g., wavelet- or Fourier-based technologies, etc.) to the events in the reference window to allow for a smaller memory footprint. Doing so may enable the user to use larger reference windows. The compression need not necessarily be lossless. However, it is noted that a longer temporal range may improve the forecasting quality faster than the newly introduced compression error worsens. The compression algorithm may, besides from providing a suitable compression quality, also be chosen with respect to an efficient decompression approach.

Figure 3:
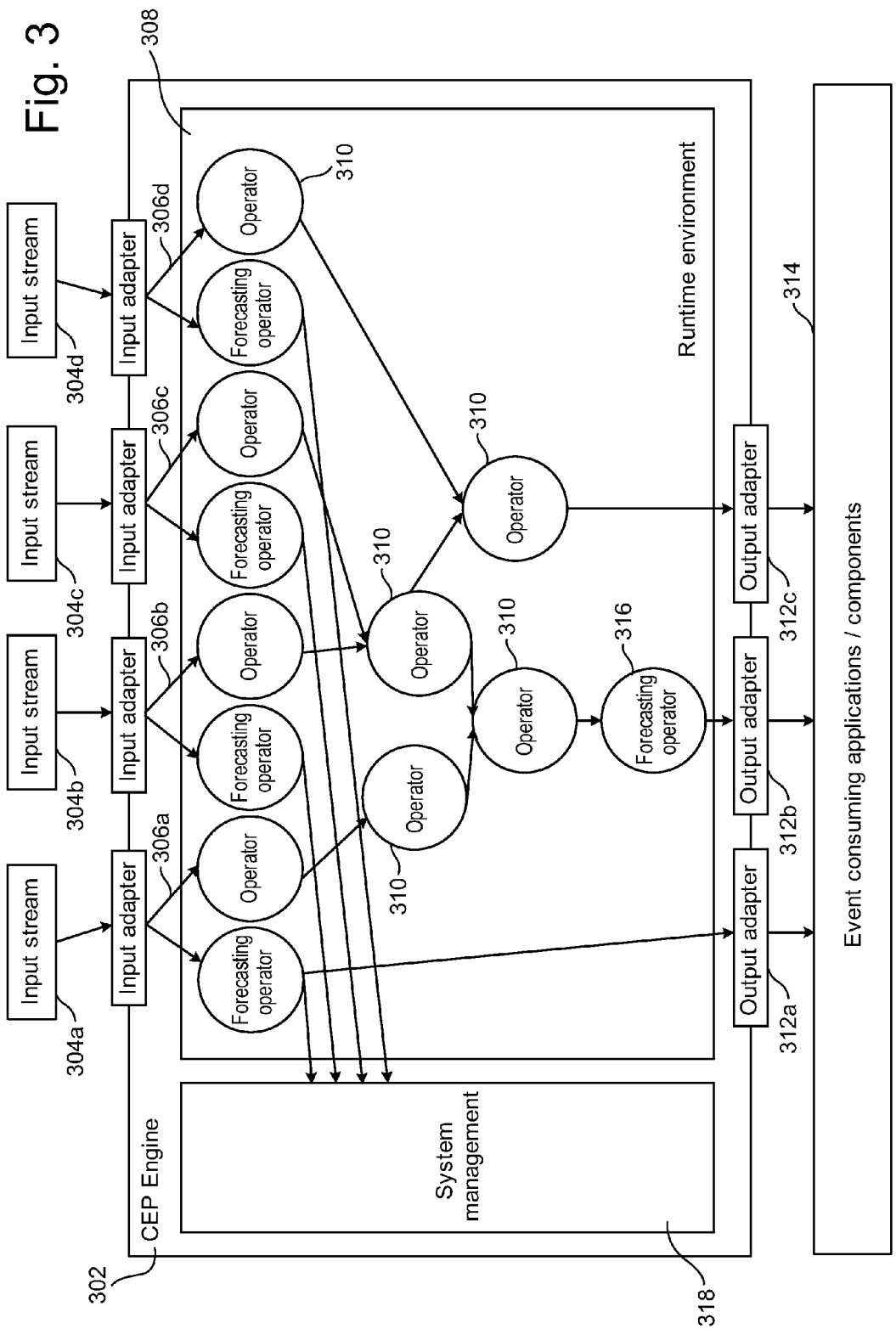
FIG. 3 is an architectural diagram that illustrates the integration of forecasting functionality into a CEP system in accordance with an example embodiment.

FIG. 3 is an architectural diagram that illustrates the integration of forecasting functionality into a CEP system in accordance with an example embodiment. In certain example instances, the integration of the forecasting functionality into the CEP system may be designed analogously to the integration of query functionality. CEP systems (including the CEP engine 302 that may be executed under the control of processing resources comprising one or more processors, memories, and non-transitory storage locations) typically have for the data flow a three-layer architecture. A plurality of input adapters 304a-d are connected to the input event streams 306a-d to be analyzed. Within the runtime environment context 308, operators 310 continuously receive events from the input streams 304 and analyze them by means of their operator-specific analysis logic. For instance, a filter operator filters events with respect to a filter predicate. Operators 310 can be connected to other operators to allow for a cascade of analysis functionality. Event sinks consume the results and process them, e.g., by visualizing them in graphical components. Thus, a plurality of output adapters 312a-c may feed output to event consuming applications and/or components 314. To allow for increased flexibility, the forecasting functionality may be encapsulated in an operator in certain example embodiments. Thus, FIG. 3 shows a plurality of operators 310 and forecasting operators 316. The forecasting techniques may be integrated into the Event Query Language, as well as in the system management component 318. The system also may maintain several forecasting operators 316 over different streams 304 in parallel. The configuration of a given forecasting operator may involve setting the size of the reference and forecast windows, the update policy, and the forecasting strategy.

It is noted that more or fewer input streams, input adapters, and output adapters may be provided in different example embodiments. Similarly, more or fewer operators and forecasting operators may be provided in different example embodiments. Furthermore, the operators and/or forecasting operators may be connected to one another in any suitable manner, and also may receive inputs directly or indirectly from any one or more input adapters and distribute outputs directly or indirectly to any one or more output adapters or the system management component.

The Event Query Language is used to specify how the event streams are analyzed. As indicated above, forecasting support can be incorporated in the Event Query Language. The discussion below provides an example description as to how a forecast clause can be incorporated in a SQL-based Event Query Language. It is noted that the definitions that follow are based on the Event Query Language of webMethods Business Events.

In this example, "Number" is defined as positive Integer, and "FieldName" is one attribute of a stream. Additionally, the consider the following clauses:

---
TimeExpression ::= Number ( "SECOND" | "SECONDS" | "MINUTE" | "MINUTES" | "HOUR" | "HOURS" | "DAY" | "DAYS" )?

---

This clause defines a time span as a positive Integer followed by a time granularity, e.g., 10 MINUTES or 1 HOUR.

The following clause defines the size of the reference window and the update policy. It may be used in the FROM clause after a stream specification.

---
WindowClause ::= "WINDOW" "(" ( "ROWS" Number ( "SLIDE" Number )? | "RANGE" TimeExpression ( "SLIDE" TimeExpression )? ) ")"

---

"ROWS" defines a count-based window for a positive number of events (e.g., ROWS 10 for a window consisting of 10 events). "RANGE" defines a time window given a TimeExpression (e.g., RANGE 5 MINUTES for a 5 minutes window). "SLIDE" defines the corresponding update policy. For instance, to update each 5 events for a count-based window, use ROWS 10 SLIDE 5. No SLIDE could mean that the forecast is updated for each incoming event.

The FORECAST clause may be defined as:

---
ForecastClause ::= "FORECAST" "(" FieldName ")" "WINDOW" "(" ( "ROWS" Number | "RANGE" TimeExpression ) ")"

This clause defines which field is forecasted and additionally specifies the forecast window, either as count-based or a time window.

A number of example queries will now be presented, demonstrating how these example definitions may be used.

To forecast the price of a stock stream for the next hour given the events of the last 2 hours:

```
SELECT FORECAST(price) WINDOW(RANGE 1 HOUR)
FROM StockStream WINDOW(RANGE 2 HOURS);
```

To update the forecast only each 5 minutes:

```
SELECT FORECAST(price) WINDOW(RANGE 1 HOUR)
FROM StockStream WINDOW(RANGE 2 HOURS SLIDE 5 MINUTES);
```

To forecast the next price given the last 20 prices, we state

```
SELECT FORECAST(price) WINDOW(ROWS 1)
FROM StockStream WINDOW(ROWS 20);
```

Figure 4:
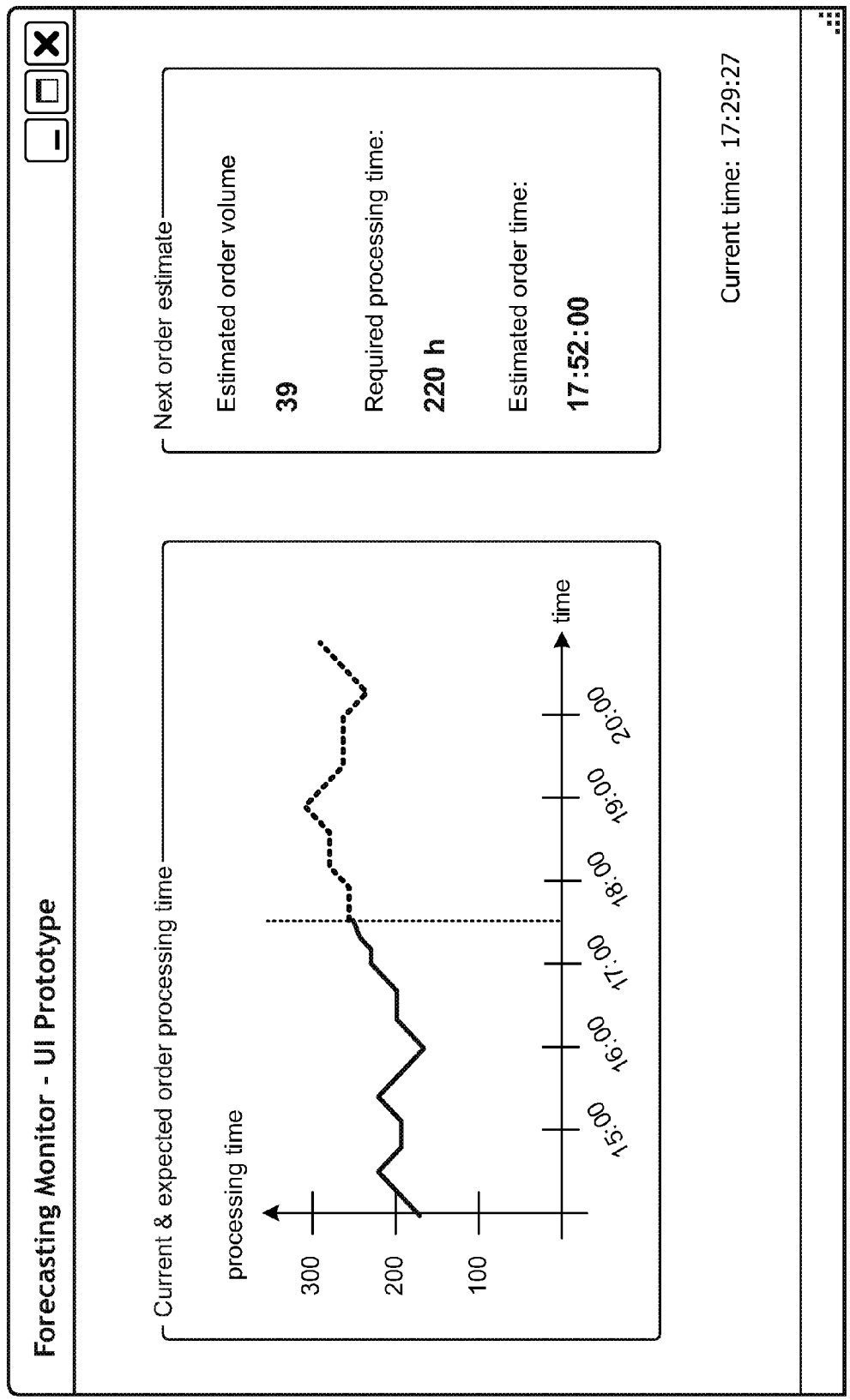
FIG. 4 is an illustrative screenshot showing how the forecasting functionality described herein may be integrated into a user interface in accordance with certain example embodiments.

FIG. 4 is an illustrative screenshot showing how the forecasting functionality described herein may be integrated into a user interface in accordance with certain example embodiments. As shown in the FIG. 4 example, for an order volume that arrives in batches, the size and time of the next batch is forecasted. Additionally, the required time for processing the orders is forecasted for a time window of several hours. Current and expected order processing times are also graphed to provide a visualization of the actual and expected data.

The management component of a CEP system also may leverage the forecasting operator in certain example embodiments. If forecasting operators are connected to each input stream, the management component may receive an estimation of the stream characteristics in the near future. This may include, for example, the input rate (e.g., the number of incoming events per second, the total number of events in a given timeframe, etc.). With those stream characteristics, the system may be able to estimate its future load. A SQL-based CEP engine may use a cost model for its queries that delivers, per query, an estimate of its processing cost. Given the future stream characteristics and the cost model, the system may be able to develop a comprehensive overview of the processing load in the near future.

This future load profile can be utilized in different system-relevant tasks including, for example:

Identification of expected load-intensive queries: Given the load profile of each query, the system may maintain a top-k list of the expected most load-intensive queries. If the system has to stop queries (e.g., in response to an actual load or in anticipation of an expected load), the user may be informed proactively that queries are load-intensive and should be stopped.

Triggering query optimization: The optimizer of a CEP system is configured to try to improve the event flow through the engine so that increased throughput and reduced latency are achieved. Because this process typically is resource-intensive, it may be triggered regularly, but for example when the system has enough free resources. If the future load profile of the queries indicates that there will be enough free resources in the near future, the system may trigger the optimization process in advance.

Adaptation to high system load: Analogously, the system may use the load profile to proactively adapt to expected high system load. The threads processing the load-intensive streams and the affected queries may be given higher priority to increase their throughput. If the expected load exceeds the system capacities, then the system may for example proactively distribute queries to other CEP systems to reduce the load.

Communication with other software components: The CEP system may communicate its forecasting insights to other software components to which it is connected. This sort of communication may allow the other components to update or take appropriate actions or refrain from taking actions in response to the future stream behavior, as well.

Figure 5:
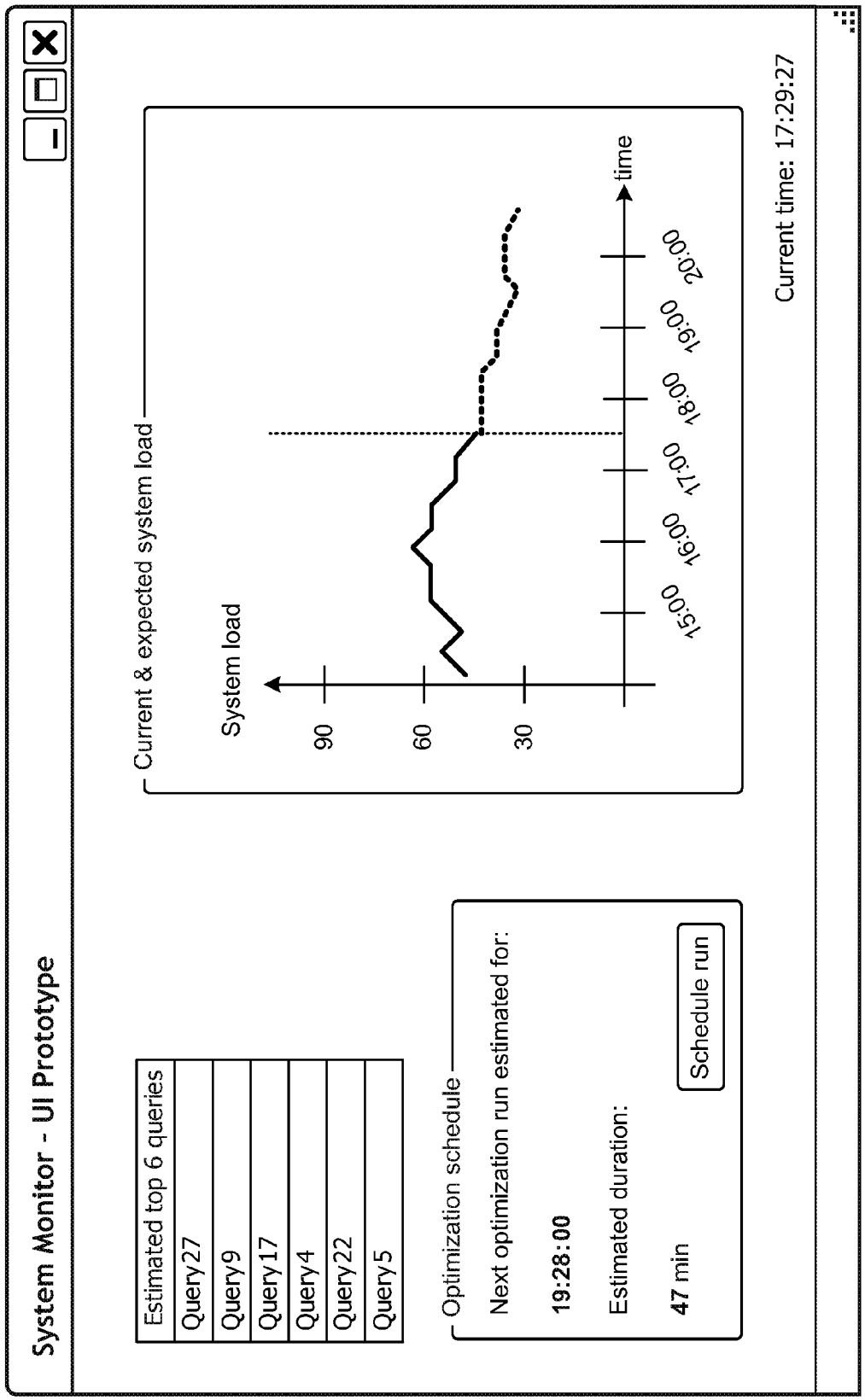
FIG. 5 is an illustrative screenshot showing how the forecasting functionality for system monitors described herein may be integrated into a user interface in accordance with certain example embodiments.

FIG. 5 is an illustrative screenshot showing how the forecasting functionality for system monitors described herein may be integrated into a user interface in accordance with certain example embodiments. As shown in FIG. 5, the top six queries estimated to for execution are shown. It is noted that more or fewer than six queries may be shown in different implementations. Based on expected system loading, a time for running the next optimization has been estimated, along with its potential duration. This information may be used to interface with a scheduling model to instruct the CEP system to work with the estimated parameters, provide an override or threshold at which the optimization is to be completed, etc. Also shown in the graph to the right of the example screen are the current and expect system loads.

It will be appreciated that forecasted data may be replaced with real data, as it becomes available. For instance, the example graphs may be updated as time progresses. Moreover, in certain example embodiments, it may be possible to view actual and predicted data side-by-side or in another way that facilitates a quantitative and/or visual comparison therebetween. This and/or other information may help a user make adjustments to the business and/or underlying system(s), as well as the forecasting parameters, on-the-fly. In certain example embodiments, some changes may be made automatically (e.g., without direct human intervention), e.g., so as to smooth out anticipated peaks and/or valleys in processing requirements, business requirements, etc.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forecasting how an event stream will behave in the future, the method comprising:

receiving, by using at least one processor, an event stream including a plurality of events upon which a forecast is to be based; and for each received event in the event stream:
  updating, by using at least one processor, a reference window indicative of a predefined temporal range during which the forecast is to be computed so that the reference window ends with the respective received event so that the reference window moves with the event stream;
  determining, by consulting a forecasting update policy, whether the forecast is to be triggered;
  in response to determining the forecast is to be triggered, generating, by using at least one processor, a new forecasting window indicative of a temporal range in which events are to be forecasted;
  for the new generated forecasting window and while a period of time associated with the forecasting window is not exceeded, (a) generating, via at least one processor, a plurality of forecasted events based on the updated reference window and (b) inserting the plurality of forecasted events into the new forecast window; and
  publishing the new forecast window that includes the inserted plurality of forecasted events,
  wherein the reference window is updated multiple times for each update of the temporal range of the new forecasting window.

2. The method of claim 1, wherein the reference window is a time-based window or a count-based window.

3. The method of claim 1, further comprising adjusting, in response to user input, the reference window to selectively emphasize either short-term or long-term stream tendencies in the event stream.

4. The method of claim 1, wherein the forecasting window is a time-based window or a count-based window.

5. The method of claim 1, wherein the forecasting update policy triggers an update upon a predefined number of events occurring or at a user-specified time interval.

6. The method of claim 1, wherein the forecasting of the plurality of forecasted events comprises, for each one of the plurality of forecasted events:
  calculating a data portion for the forecasted event based on data portions of the events in the sliding reference window;
  calculating a start timestamp for the forecasted event; and calculating an end timestamp for the forecasted event.

7. The method of claim 6, wherein the start timestamp for each one of the plurality of forecasted events is calculated by adding to an immediately prior start timestamp an estimated distance to the next start timestamp.

8. The method of claim 7, wherein the estimated distance is based on distances from the reference window.

9. The method of claim 7, wherein the end timestamp for each one of the plurality of forecasted events is calculated by adding an estimated time interval length to the calculated start timestamp for the forecasted next event.

10. The method of claim 9, wherein the estimated time interval length is based on time interval lengths of events in the reference window.

11. The method of claim 6, wherein at least one of the plurality of forecasted events is used in the forecasting of another forecasted event forecasted to occur later in time.

12. The method of claim 1, wherein the forecasting of the plurality of forecasted events is practiced in accordance with a predefined forecasting strategy, the forecasting strategy including at least one strategy selected from the group consisting of:
  (a) repeating values from the events in the reference window in a forward or backward manner;
  (b) randomly selecting values from the events in the reference window;
  (c) applying a weighted or unweighted average to values from the events in the reference window;
  (d) smoothing an incrementally computed weighted average of the next event and a last estimate in accordance with a smoothing parameter controlling the emphasis of recent events;
  (e) performing density-based resampling; and
  (f) combining the reference window with a set of one or more predefined historic reference windows.

13. The method of claim 12, further comprising adapting parameters of the selected forecasting strategy based on an assessment of predicted event accuracy.

14. The method of claim 12, further comprising applying a conjoint estimate to data portion, event inter-arrival time, and time interval length parameters.

15. The method of claim 1, further comprising:
  applying a learning algorithm to the forecast; and
  adjusting the temporal range of the reference window and/or the forecasting window in response to the learning algorithm.

16. The method of claim 1, further comprising compressing events in the reference window.

17. The method of claim 16, further comprising increasing the temporal range of the reference window,
  wherein the compressing and the increasing are balanced so that forecasting quality increases at a rate faster than compressing introduces error.

18. The method of claim 1, further comprising displaying business data indicative of events in the event stream along with business data indicative of forecasted events.

19. The method of claim 1, further comprising displaying system management event data along with forecasted system management event data.

20. A complex event processing (CEP) system, comprising:
  at least one processor;
  a CEP engine under the control of at the least one processor; and
  at least one input adapter configured to receive an event stream including events and feed event data for the events from the event stream to the CEP engine;
  wherein the CEP engine comprises:
    at least one operator configured to directly or indirectly receive and process the event data for subsequent, direct or indirect, output to a system management application of the CEP system and/or an event consuming application or component in communication with the CEP system,
    at least one forecasting operator configured to directly or indirectly receive and process the at least one said event stream by:
      (a) for each received event in the event stream:
        updating a reference window indicative of a predefined temporal range during which the forecast is to be computed so that the reference window ends with the received event, the reference window moving with the event stream, and
        determining, by consulting a forecasting update policy, whether the forecast is to be triggered,
        in response to determining the forecast is to be generated, updating a forecasting window indicative of a temporal range in which events are to be forecasted;
        for the updated forecasting window and while a period of time associated with the forecasting window is not exceeded, (i) generating, via at least one processor, a plurality of forecasted events based on the updated reference window and (ii) inserting the plurality of forecasted events into the forecast window; and publishing the forecast window that includes the inserted plurality of forecasted events, and (b) directly or indirectly output the forecast to the system management application of the CEP system and/or an external application or component, wherein, for each update to the temporal range of the forecasting window, the reference window is updated multiple times.

21. The CEP system of claim 20, wherein the at least one said event stream includes (1) input streams to a CEP query that is to be forecasted and (2) intermediate streams computed by other forecasting operators.

22. The CEP system of claim 20, wherein at least one of the plurality of forecasted events is generated independently of any pre-defined rule that specifies a predetermined timeframe and predetermined probability for generation of the at least one of the plurality of forecasted events.

23. A non-transitory computer readable storage medium tangibly storing instructions that are executable by at least one processor of a complex event processing (CEP) system, the stored instructions comprising instruction that are configured to cause the complex event processing (CEP) system to:

accept an event stream including a plurality of events upon which a forecast is to be based; and for each received event in the event stream:

update a reference window indicative of a predefined temporal range during which the forecast is to be computed so that the reference window ends with the received event, the reference window moving with the event stream;

determine, by consulting a forecasting update policy that is stored on a memory device of the CEP system, whether the forecast is to be triggered;

in response to determination that the forecast is to be generated, generate a forecasting window indicative of a temporal range in which events are to be forecasted;

for the updated forecasting window and while the time period of the forecasting window is not exceeded, (a) generate a plurality of forecasted events based on the updated reference window and (b) insert the plurality of forecasted events into the forecast window; and publish the forecast window that includes the inserted plurality of forecasted events, wherein the forecasting update policy indicates that the forecasting window is updated only after multiple updates to the reference window have occurred.

* * * * *